United States Patent [19]
Akers et al.

[11] Patent Number: 6,156,281
[45] Date of Patent: Dec. 5, 2000

[54] PROCESS FOR REMOVAL OF HAZARDOUS AIR POLLUTANTS FROM COAL

[75] Inventors: David J. Akers, Indiana, Pa.; Kenneth N. Ekechukwu, Silver Spring; Mobolaji E. Aluko, Burtonsville, both of Md.; Howard E. Lebowitz, Mountain View, Calif.

[73] Assignees: Howard University, Washington, D.C.; CQ Inc., Homer City, Pa.

[21] Appl. No.: 09/205,571

[22] Filed: Dec. 4, 1998

[51] Int. Cl.[7] .............................. C01G 9/00; B01D 47/00; C01B 31/02; C10L 5/00

[52] U.S. Cl. .......................... 423/107; 423/210; 423/461; 44/621; 44/626

[58] Field of Search ...................... 44/621, 626; 423/107, 423/210, 461, 109, 99

[56] References Cited

U.S. PATENT DOCUMENTS

| | | | |
|---|---|---|---|
| 3,917,465 | 11/1975 | Meyers | 44/2 |
| 4,839,029 | 6/1989 | Ichikawa et al. | 208/251 R |
| 5,403,365 | 4/1995 | Merriam et al. | |
| 5,478,540 | 12/1995 | Walles | |

OTHER PUBLICATIONS

"Coal Cleaning: A Trace Element Control Option", Published in Managing Hazardous Air Pollutants, Lewis Publishers, David J. Akers, 1993, pp. 483–493.

"Role of Coal Cleaning in Control of Air Toxics", Fuel Processing Technology, Elsevier Publishers, David Akers, Robert Dospoy, 1994, pp. 73–86.

"The Redistribution of Trace Elements During The Beneficiation of Coal", Environmental Aspects of Trace Elements in Coal, Kluwer Academic Publishers, David J. Akers, Chapter 6, 1995, pp. 93–110.

"The Mechanisms of Trace Element Removal During Coal Cleaning", Coal Preparation, Gordon and Breach Science Publishers, David J. Akers and Clifford E. Raleigh, 1998, vol. 19, Nos. 3–4, pp. 257–269.

"Coal Cleaning for HAP's Control: Cost and Performance", Official Program & Exhibit Directory, The 23rd International Technical Conference on Coal Utilization & Fuel Systems, David J. Akers, Zalman Zitron, pp. 1–11, Mar. 1998.

"Major Changes in U.S. Coal Prep?", World Coal, David J. Akers, Jul. 1998, (Reprint by CQ Inc.).

*Primary Examiner*—Steven P. Griffin
*Assistant Examiner*—Jonas N. Strickland
*Attorney, Agent, or Firm*—James L. Bean

[57] ABSTRACT

An improved process for removing mercury and other trace elements from coal containing pyrite by forming a slurry of finely divided coal in a liquid solvent capable of forming ions or radicals having a tendency to react with constituents of pyrite or to attack the bond between pyrite and coal and/or to react with mercury to form mercury vapors, and heating the slurry in a closed container to a temperature of at least about 50° C. to produce vapors of the solvent and withdrawing vapors including solvent and mercury-containing vapors from the closed container, then separating mercury from the vapors withdrawn.

16 Claims, 2 Drawing Sheets

PROCESS FOR REMOVAL OF HAZARDOUS AIR POLLUTANTS FROM COAL

This invention was made with Government support under Contract No. DE-AC22-95PE95153 awarded by the Department of Energy. The Government has certain rights in this invention.

BACKGROUND OF THE INVENTION

1. Field of the Invention

This invention relates to the removal of potentially hazardous metals and/or trace elements from coal, and more particularly to a process for chemical cleaning of coal to remove mercury, either alone or along with other trace elements, prior to combustion of the coal, thereby reducing potential hazardous air pollutants (HAPs) in the combustion products.

2. Description of the Prior Art

It is common practice to clean or wash mined coal to remove debris, ash producing clays, and the like before the coal is burned. This cleaning process may involve a froth flotation, gravity separation, or other physical washing or cleaning process.

It is also known that coal washing processes are effective in removing a portion of the trace element content of coal, which trace elements remain in the coal cleaning waste streams. As a result, the quality of ground and surface water resources may be adversely affected if the trace elements discharged to impoundments or land fills exist in minerals that are or may become unstable. It is generally considered that these trace elements which are found in coal are relatively stable over geologic time periods, and that physical coal washing does not alter these minerals. This indicates that with the application of proper disposal techniques, trace elements removed by physical washing of coal should not materially contaminate ground or surface water. At the same time, some concern remains over the possibility and extent of contamination of ground and surface water, particularly if increased cleaning efficiencies result in a greater amount of the trace elements being released in the coal cleaning waste streams. It is therefore desirable to remove potentially hazardous trace elements by processes which permit their recapture for use, or for hazardous material disposal.

Of greater concern is that the release of HAPs to the atmosphere from burning coal containing HAP precursors such as mercury, arsenic, chromium and selenium, and mercury has been identified for potential regulation under the 1990 Amendments to the Clean Air Act. While some portion of all these elements may be removed by conventional coal cleaning processes, a major portion normally remains in the cleaned coal. For example, typical mercury reductions may be about 37% and selenium reductions may be about 40% by known commercial washing processes, leaving potentially hazardous amounts of these elements in the cleaned coal.

It is known that trace elements occur in coal in a wide variety of mineral and organic associations, and these associations vary from element to element and from coal to coal. The occurrence of mercury in coals is such that it is either associated with pyrite, embedded in the pyrite phase, finely dispersed in the pyrite, or is organically bonded and finely dispersed in the coal matrix. Of significance is the fact that mercury and its compounds formed during removal from coal using known chemical removal solvents were not stable. During treatment, once equilibrium is reached at some definite condition, the rate of removal from the coal into the solvent, as well as from the solvent to the vapor stage, equals the rate at which the mercury in the solvent solution returns to the coal particles and from the vapor phase back into the solvent. Thus, no noticeable increase in efficiency is obtained over an infinite length of time in which the coal is in contact with the solvent solution. In other words, the removal rate for mercury from the coal at equilibrium is the same as the return of mercury to the coal, and extended exposure does not increase the efficiency of the process.

It is, therefore, a primary object of the present invention to provide an improved method for removal of mercury from coal, utilizing a solvent extractant process. It is another object of the present invention to provide an improved method of removing mercury and other potential HAP precursor trace elements from coal.

Another object is to provide an improved method of removing potential HAP precursor trace elements from coal which has been previously cleaned by physical cleaning processes.

Another object is to provide a chemical leaching method of removing mercury from cleaned or uncleaned coal.

Another object is to provide an improved chemical method for removal of mercury, selenium, chromium and arsenic from coal using an ionizing and leaching solution which forms complex ions with at least one of the trace elements to be removed or with a host mineral in which at least one trace element resides.

Another object is to provide an improved chemical process for the removal of mercury, or mercury and other HAPs from coal using a solvent extractant capable of forming ions or radicals capable of reacting with constituents of pyrite and/or mercury, and/or to attack the bonds between pyrite and coal.

Another object is to provide an improved method of removing mercury from coal and for recovering the mercury so removed.

Another object is to provide an improved and economical process for cleaning coal to remove trace elements and controlling HAPs emissions, particularly mercury emissions, to prevent their discharge into the atmosphere upon burning of coal.

SUMMARY OF THE INVENTION

In the attainment of the foregoing and other objects of the invention, an important feature resides in providing a chemical wash for coal, preferably previously physically cleaned crushed or ground coal or coal fines (hereinafter coal or coal fines), which is effective in removing trace element, including mercury, from the coal. The chemical wash, or leaching solution, is a solvent solution which may be either an acid or a base, and which is capable of forming ions or radicals having a tendency to react with constituents of pyrite or with mercury itself, and/or to attack the bond between pyrite and coal (hereinafter sometimes referred to generally as an ionizing solution), or to form complex ions with mercury or mercury-containing compound at a temperature at or below the boiling point of the solvent. Preferably the solvent also forms either complex ions or compounds with other trace elements such as chromium, selenium and arsenic, which may be removed by precipitation and filtration from the cleaning solution.

Removal solvents or ionizing solutions useful in accordance with this invention include any liquid medium, or liquid mixture, which is itself an active agent that affects removal of mercury, or a medium inside of which the active removal agent is dissolved. A broad array of removal agents may be employed, including mineral acids (e.g. HCl), mineral bases (e.g. $HN_4OH$), chelating agents (e.g. citric acid and oxalic acids), oxidizing agents (e.g. Ca(OCl)2), and organic acids (e.g. $CH_3COOH$). All of these removal agents are capable of forming free ions and/or free radicals when in solution which, when brought into contact with coal, cause a chemical reaction, or series of reactions, with pyrite or mercury-containing materials contained in the coal. The term free ion or free radical is understood as the relative disengagement of the anion from the cation or the radical from its string counterpart so that the ions or radicals will be able to react with one or several constituents of pyrite or mercury-containing material intended for removal.

In a preferred embodiment of the invention, the process involves blending finely divided coal such as coal fines from a conventional coal washing process or crushed coal with an ionizing solution to form a slurry. Ionizing solutions which have been found to be effective include ammonium hydroxide, calcium hypochlorite, oxalic acid, citric acid, vinegar and hydrochloric acid. Ammonium hydroxide ($NH_4OH$) has been found to be effective in the removal of mercury, selenium, chromium and arsenic, and from an economic standpoint may be a preferred ionizing solution for use in the process. The process will therefore be described herein with reference to ammonium hydroxide, it being understood that other ionizing solutions may also be used and may be equally or more effective in the removal of some HAPs.

Coal in the slurry is exposed to the ionizing effect of the ammonium hydroxide for a sufficient time to form elemental mercury and/or complex ions with at least a portion of the mercury in the coal, and to form compounds or complex ions with other HAPs contained in the coal. The complex ions and/or compounds of the HAPs which are formed in the slurry are separated from the solution and captured for use or for hazardous waste disposal. Preferably heat is applied to the slurry to accelerate the process and to produce vapor containing complex ions of mercury, which vapors are then passed into a mercury capture reactor, the contents of which are periodically filtered to remove mercury-containing compounds. After a predetermined time, the coal is separated from the liquid solution containing compounds or ions of other HAPs such as chromium, selenium and arsenic and these materials may be removed from the liquid solution in a suitable separation unit as by precipitation and filtration. After separation, the ionizing solution may be returned, along with fresh make-up solution, to the mixing chamber for the mixing of additional slurry.

It has been found that adding sufficient heat to the slurry will result in the complex ions of mercury and mercury containing compounds being sublimated and/or picked up in the solvent solution vapor, and this vapor may be passed into a capture reactor such as a sulfuric acid bath which will cause the mercury to precipitate so that it may be removed by filtration as a stable mercury compound.

BRIEF DESCRIPTION OF THE DRAWINGS

Other features and advantages of the invention will be apparent from the detailed description contained hereinbelow taken in conjunction with the drawings, in which.

DESCRIPTION OF THE PREFERRED EMBODIMENTS

Figure 1:
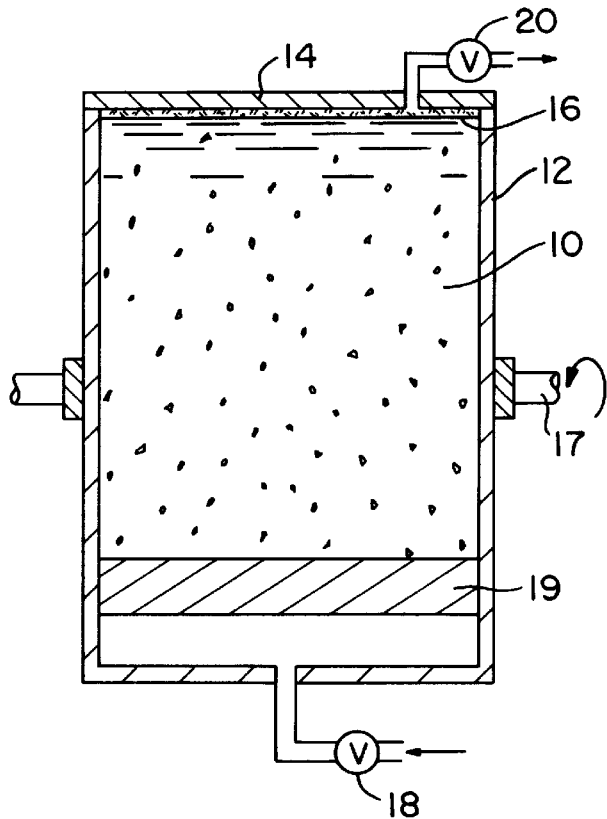
FIG. 1 is a sectional view of a zero head extractor used in laboratory testing of the process of the invention.
Figure 2:
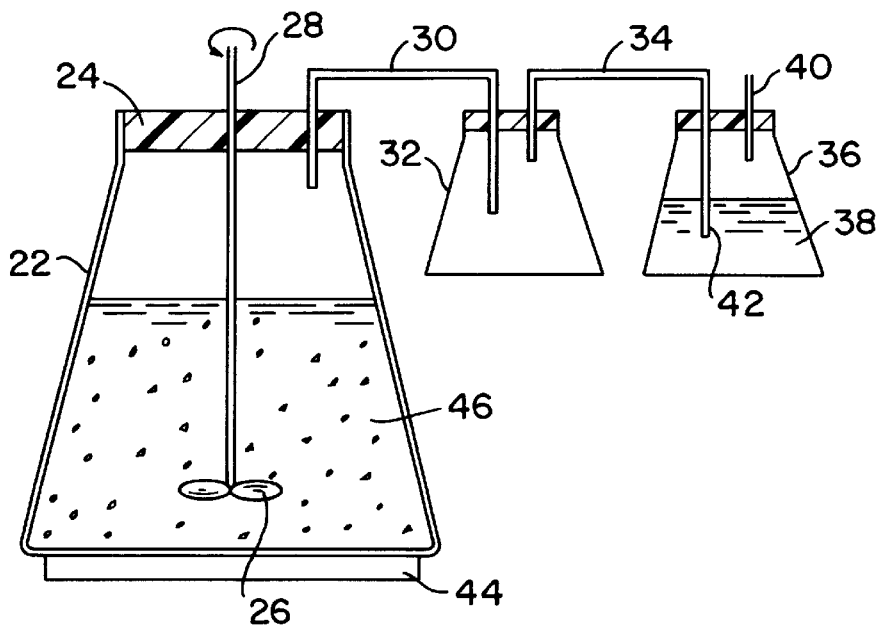
FIG. 2 is a sectional view of a continuous stirred tank reactor used in laboratory testing.

Bench scale, chemical treatments were applied to investigate the potential for reducing mercury and other HAPs precursors from a variety of coals, using both a zero head extractor (ZHE) as shown in FIG. 1 and a continuous stirred tank reactor (CSTR) as shown in FIG. 2. Treatment solutions tested included a normal solution of hydrochloric acid, a 2% solution of citric acid, a 2% solution of oxalic acid, a 5% solution of vinegar, a 0.1 normal solution of ammonium hydroxide and a 2% solution of calcium hypochlorite. In addition, deionized water was tested but found ineffective in substantially reducing either mercury or other monitored HAPs from previously washed coal. Tests were conducted for the removal of mercury, selenium, chromium and arsenic. Certain tests also included the application of ultrasound energy to the slurry of coal particles and treating solution.

In the ZHE test, known quantities of coal and processing solvent were was introduced into the chamber 10 of extractor vessel 12, and the vessel was closed by closure 14 at the beginning of each test and all free head above the solution surface was eliminated so that any trace element extracted could be retained in the solution. A filter 16 was fitted in the ZHE chamber before closure 14 was applied. All free head space by applying air pressure through valve 18 to raise piston 19. The vessel 12 was mounted on a rotary arm (indicated schematically at 17) for rotation about the axis of the arm to stir the slurry for a predetermined time at the end of which the liquid removed through the filter 16 and outlet valve 20, was analyzed for mercury, arsenic, selenium and chromium.

In the CSTR tests, predetermined quantities of coal and treating solution were placed in a conical flask 22 which was closed with a removable plug type closure 24. A stirrer 26 in the container had a drive shaft 28 extending through the top closure 24, and a gas conduit 30 having an opening located in the flask 22 above the treating solution extended from flask 22 through the top 24 to a closed condenser flask 32. A second gas conduit 34 extended from the closed condenser flask 32 to a closed mercury capture flask 36 containing a sulfurous acid bath 38 which had been stabilized with concentrated sulfuric acid. The space above the bath was vented to atmosphere through vent 40, and conduit 34 terminated in an open end 42 below the surface of bath 38.

The flask 22 was placed on a heating element 44 and the slurry 46 was heated to a desired temperature and continuously stirred for a predetermined time, during which vapor from the chamber was permitted to escape through conduit 30 to the condenser 32 then through conduit 34 to be bubbled through bath 38 in flask 36. At the conclusion of the test, the solid and liquid components of the slurry were separated by filtration and the liquid solution and capture bath 38 were analyzed separately for mercury, arsenic, selenium and chromium.

In an alternate arrangement of the CSTR apparatus, the stirrer 26 and shaft 28 were removed and an ultrasonic transducer, or horn was inserted into the solution to apply ultrasound energy during treatment. Tests indicated, however, that ultrasound energy at levels believed necessary for enhanced HAPs removal resulted in excessive breaking up of the coal particles.

The results of the tests using the ZHE chamber showed that only minor amounts of the monitored trace elements were removed, although the tests did indicate that slightly superior performance was achieved by use of oxalic acid as the treating solution. The low efficiency of this removal process is believed attributable to the fact that no external heat was added, i.e., the tests were conducted at ambient temperature of 20° C. (68° F.).

Tests were conducted on bituminous coals having a size of −28 mesh and −100 mesh. Samples of Powder River Basin (PRB), Northern Appalachian (NAPP), Southern Appalachian (SAPP) and Eastern Interior (EI) coals were tested. Commercial testing laboratories were employed to analyze the feed coals and these analyses were employed in calculating removal efficiencies. It was attempted to minimize sampling error by homogenizing several splits of feed coal samples together before weighing out the amount needed for a particular run.

The following table summarizes the removal efficiencies, using the CSTR treatment process and apparatus described above, without ultrasound, and using a solvent to coal ratio of two. Two vessels were tested and the results averaged, using −100 mesh coal.

between −28 and −100 mesh coal size, particle size had little effect on removal efficiency.

The following table illustrates the removal efficiencies, calculated from treated coal analyses of different coal feeds and of different solution or reagent materials, based upon percentage of mercury removal. The greater than 100% removal for the PRB coal using oxalic acid reagent reflects an obvious error in test results which could have resulted from an inadvertent over dilution of the analyte, an initial feed sample not representative of the actual feed, or of inadvertently using processed coal instead of feed coal for moisture determination.

Removal Efficiencies at Elevated Temperatures With Complete Light Product Analysis -- CSTR Mass Balance Suites

| Coal/Solvent | Removal Efficiencies, % | | | | Size: Minus 100 Mesh Time - 4 hours |
|---|---|---|---|---|---|
| | Hg | As | Se | Cr | Conditions |
| NAPP-OXA-MBL | 31.50 | 3.30 | 93.10 | 25.30 | 102C |
| NAPP-NH4OH-MBL | 53.50 | 4.30 | 7.10 | 2.80 | 102C |
| SAPP-OXA-MWA | 28.50 | 16.50 | 41.80 | 7.50 | 102C |
| SAPP-OXA-MBL | 44.70 | 3.60 | 0.30 | 17.20 | 102C |
| PRB-CIT-MBL | 5.00 | 2.20 | 83.80 | 18.30 | 102C |
| PRB-Ca(OCI)2-MBL | 6.60 | 1.70 | 26.90 | 0.30 | 102C |
| PRB-VIN-MBL | 16.00 | 0.00 | 13.30 | 0.30 | 102C |

Legend: Ca(OCI)2: Calcium hypochlorite
E128: Eastern Interior - Minus 28 mesh
OXA: Oxalic Acid
H2O: Water
MBL: Mass Balance
EI: Eastern Interior - Minus 100 mesh
NAPP: Northern Appalachian - Minus 100 mesh
CIT: Citric Acid
MWA: Mass Balance with air The effect of time of exposure of the coal to the treating solution, at elevated temperature, using the CSTR process without ultrasound is shown in the following table:

Reduced Time Removal Efficiencies at Elevated Temperatures--CSTR

| Coal/Solvent | Time (Hrs) | Varied Time Removal Efficiencies, % | | | | Conditions |
|---|---|---|---|---|---|---|
| | | Hg | As | Se | Cr | |
| NAPP-NH4OH | 5 | 31.5 | 3.30 | 93.10 | 25.30 | 102C |
| NAPP-NH4OH | 4 | 53.5 | 4.30 | 7.10 | 2.80 | 102C |
| NAPP-NH4OH | 3 | 28.5 | 16.5 | 41.80 | 7.50 | 102C |
| NAPP-NH4OH | 1 | 44.7 | 3.60 | 0.30 | 17.20 | 102C |
| NAPP-OXA | 3 | 5.00 | 2.20 | 83.80 | 18.30 | 102C |
| E128-H2O | 4 | 6.60 | 1.70 | 26.90 | 0.30 | 102C |

In one test run of NAPP coal treated with ammonium hydroxide for a period of four hours, it was noted at the end of the run that conduit 34 had become collapsed, blocking the flow of gases into the capture unit. Tests revealed only an 8% removal efficiency for mercury during this run, confirming that the mercury is removed primarily through gas transport. The tests confirmed, generally, that about 30% of mercury can be removed utilizing this gas transport process within one hour. Comparisons tests showed that, Removal Efficiencies Based On Treated Coal Analyses.

−100 mesh Samples

| Coal | Reagent | Percent Hg Removal from Treated Coal | Percent Hg Removal From Extracted Solution |
|---|---|---|---|
| PRB | Oxalic Acid | 7.7 | 131.3 |
| PRB | Ca(OCI)2 | 30.8 | 78.8 |
| PRB | Oxalic Acid | 23.1 | 22.6 |
| PRB | Ca(OCI)2 | 38.4 | 6.5 |
| PRB | Vinegar | 23.1 | 15.8 |
| NAPP | Oxalic Acid | 53.8 | 57.2, 31.5 |
| NAPP | NH4OH | 50.0 | 63.3, 53.5 |
| NAPP | Water | 23.1 | 15.5 |
| EI | Oxalic Acid | 35.6 | 4.0 |
| SAPP | Oxalic Acid | 0 | 44.7 |

It was determined that selenium removal could not be accurately measured based upon the treated coal and therefore the results reported were based solely on the selenium measurement from the recovered solvent.

Removal efficiencies vary greatly with the feed coal used. For example, tests using the CSTR testing procedure described above indicated a 52%±2% removal of mercury from NAPP coal and a 29%±7% removal of mercury from PRB, at the 95% significance level. The reasons for the differences in efficiencies based upon the feed coal is not understood, nor is the precise process by which the HAPs are removed fully understood. It is known, for example, that trace elements occur in coal in a wide variety of mineral and organic associations, and these associations vary from element to element and from coal to coal. In general, however, mercury found in coals exist in a form which is relatively stable, and therefore an effective removal system necessarily involves conversion of the mercury to an unstable form to facilitate mobilization and removal. The process terminates in conversion of mercury back to stable form. It is believed that this is accomplished in accordance with the present invention by utilizing an electrolytic treatment solution which acts upon the relatively stable mercury in the coal to produce relatively unstable complex mercury ions which pass readily into a vapor state, particularly upon the application of heat to the solvent-coal slurry. Thus by extracting the vapor from above the solution and condensing the vapor in a capture solution such a sulfurous acid bath to disassociate the mercury ion, the mercury can easily be separated and removed by filtration, e.g. as a stable mercury sulfide compound. It is conceivable, also, that at least some portion of the mercury exists in coal in an unstable form which is directly volatilized by the application of heat to the solvent-coal slurry, and that these mercury vapors are carried away in the solvent vapors and condensed in the acid reducing bath.

Tests conducted in the laboratory clearly indicate that other trace elements, or HAPs, are removed by a chemical treatment solution, either by a leaching action or by a chemical reaction which is not fully understood, with the removed HAPs remaining in the solution upon separation from the treated coal. The removal rate is increased by the application of heat, and to produce the desired vapor transport of mercury, heating the solution to the boiling point is desired. The boiling point may be affected either by applying a suction, or vacuum, to the treatment chamber to effectively lower the boiling point, or by pressurizing the chamber to increase the boiling point. Increasing the boiling point appears to improve removal efficiency, but greatly complicates the process for use in any commercial sized processing plant because of the pressure vessels and increased heat input required. Operating temperatures within the range of about 50° to 105° C. or higher may be employed with temperatures near the boiling point at atmospheric pressure being the most preferred operating range.

Figure 3:
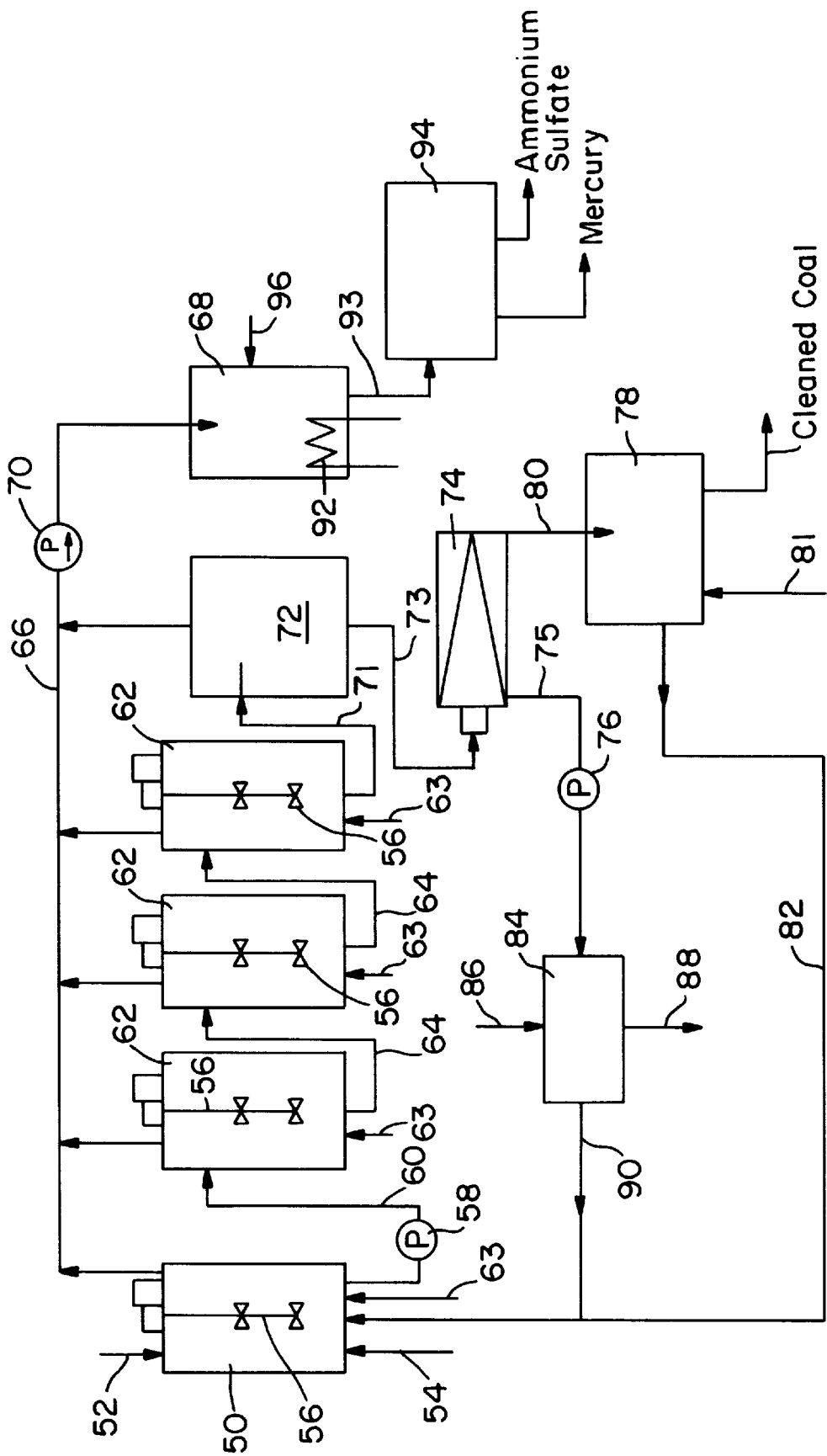
FIG. 3 is a schematic drawing illustrating a system for the removal of HAPs from coal in a continuous commercial operation.

Referring now to FIG. 3, a commercial HAPs removal coal treatment plant suitable for use in the continuous removal of HAPs from coal on a commercial scale will be described. The system includes a slurry mixing tank 50 for receiving a charge of coal to be treated, as indicated by the arrow 52, and a volume of a suitable solvent such as $NH_4OH$, indicated by the arrow 54. Preferably, the mixing tank 50 has a closed top, and a continuously driven stirring mechanism, or agitator, indicated at 56, is used to mix the coal and solvent to produce a slurry which is transferred, as by a slurry pump 58 through a conduit 60 to the first of three substantially identical closed reactor vessels 62 connected in series.

Each reactor vessel 62 is provided with a stirring mechanism or agitator system which may be identical to the stirring system 56 employed in the mixing chamber 50. The reactor vessels 62 are connected to one another by conduits indicated at 64. Preferably coal and solvent are supplied to the mixing chamber 50 on a substantially continuous basis and the pump 58 operates either substantially continuous or on an intermittent basis to provide a flow through the system, including mixing tank 50 and reactor vessels 62, at a rate which will provide a mean retention period sufficient to extract the HAPs from the coal.

Heat is continuously applied to the receiving vessel 50 and to the respective reactor vessels 62 to maintain the desired temperature in the mixing vessel and in the reactor vessels. Heat may be supplied, for example, by the injection of steam or by other suitable means as indicated by the arrows 63. The closed tops of the mixing tank and reactor vessels are connected to a common vapor collection line 66 which, in turn, is connected to and has an open end extending within a capture reactor vessel 68. If desired, a suitable pump, or steam ejector, 70 may be connected in line 66 to apply a suction to the closed mixing chamber and reactor chambers for purposes more fully explained hereinbelow.

From the third, or final reactor chamber, the slurry flows through line 71 into a closed separator, or holding chamber 72, having its top connected in the vapor extraction line 66 for removal of any vapors generated from the hot slurry in the separator chamber.

From the separator 72, the coal and ionic solution passes through line 73 to a centrifuge 74 where the liquid solvent is separated and extracted through line 75 by a pump 76. The coal separated by the centrifuge 74 then passes into a stripping chamber 78 as indicated by the arrow 80 and steam is injected through line 81 to strip any residual $NH_4OH$. Cleaned coal is removed from the separator and the steam and solvent recovered by stripping flow from the stripper 78 through conduit 82 to be fed back into the mixing chamber 50, thereby conserving the heat energy of the steam and providing a closed loop for the salvaged extraction solution.

The extraction solution from the centrifuge 74 is flowed, by pump 76, through a precipitation unit 84 where precipitation agents such as lead acetate $(Pb(CH_3COO)_2$ barium nitrate $(Ba(NO_3)_2)$ or stannous chlorides $(SnCl_2$ or $SnCl_4$ are admitted into the extraction stream, as indicated at 86, to react with soluble chromium, selenium and arsenic compounds to precipitate insoluble salts or compounds to form a sludge which can be removed from the precipitator by filtration as indicated at arrow 88. The solvent solution, from which the removed HAPs have been precipitated, passes from the precipitation unit through conduit 90 which is connected in the conduit 82 to be returned to the mixing chamber.

The capture reactor 68 contains a liquid condensing solution for condensing the vapors from the mixing and reactor chambers, and to this end, the open end of conduit 70 is submerged in the condensing solution. Since the vapors may have a temperature of 100° C. or above, a cooling coil 92 is provided in the capture reactor to maintain the capture solution at a suitable low temperature.

When the treatment solution employed is ammonium hydroxide, the vapors flowing in conduit 66 will largely be steam and ammonia vapors which will act as a transport vehicle for mercury vapor and/or complex mercury ions. In this case, the treating solution with the capture reactor 68 may be a sulfuric acid solution so that the ammonia will precipitate as ammonium sulfate and the unstable mercury will precipitate as a stable mercury sulfide compound. The mixture is then withdrawn through line 93 to a filter 94 where the mercury and ammonium sulfate are separated. Makeup sulfuric acid is added to the precipitator unit 68 as required, as indicated by the arrow 96.

It is recognized that the system described above could be operated in a batch treatment mode wherein the mixing chamber could also act as the reaction chamber, and wherein the slurry would be maintained for the desired treatment period before being pumped therefrom through the separator and centrifuge apparatus, with the mixing vessel being continuously connected with the capture reactor through the conduit 60.

When the pump 70 is employed, particularly an injector type pump which is capable of applying substantial vacuum pressures, the pressure within the reactors and mixing chambers can be reduced to substantially reduce the boiling point of the slurry. This enables the production of sufficient transport vapor to remove the mercury at temperatures substantially below 100° C. Conversely, the pump 70 may be replaced with a flow restriction which will produce an increased pressure in the mixing vessels and reactors, with a consequent increase in the boiling temperature of the solvent or extraction solution. This enables heating of the solution to a temperature above 100° C. to increase the reaction rate and HAPs removal efficiency of the system. A pressurized system presents economic and potential pollution issues, however, and in the preferred arrangement, the system operates at or near atmospheric pressure and at a temperature not substantially above the boiling point of the solvent solution. This may, of course be varied as indicated, and the low temperature for effective HAPs removal appears to be about 50° C. and preferably about 60° whereas, in the pressurized system, economic and potential pollution issues suggest an upper preferred operating temperature of about 105° C., although temperatures up to about 120° C. or higher may be achieved with a corresponding increase in pressure. The preferred temperature for atmospheric pressure operation is within the range of about 100° to about 102° C.

While preferred embodiments of the invention have been disclosed and described, it is apparent that modifications may be made thereto, and it is therefore understood that the invention is not limited to the specific embodiment disclosed, but rather it is intended to include all embodiments which would be apparent to one skilled in the art which come within the spirit and scope of the invention.

What is claimed is:

1. A process for removing Hg from coal containing pyrite and Hg comprising the steps of mixing the coal in finely divided form with a liquid solvent to form a slurry, the solvent being a liquid capable of forming ions or radicals having a tendency to react with constituents of pyrite or to attack the bond between pyrite and coal and to react with mercury to release mercury vapors, heating the slurry in a closed container to a temperature within the range of about 50° C. to about 120° C., withdrawing of vapors containing Hg from said closed container and separating the Hg from the vapors, and separating the coal from the solvent.

2. The process defined in claim 1 wherein said slurry is heated to a temperature within the range of about 60° to about 105° C.

3. The process defined in claim 2 wherein said solvent is a mineral acid solution, a mineral base solution, a chelating agent solution, an oxidizing agent solution, or an organic acid solution capable of forming free ions and/or free radicals when the solution is brought into contact with the coal to produce a chemical reaction with pyrite or other mercury containing material in the coal.

4. The process defined in claim 3 wherein said liquid solvent is selected from the group of solvents including hydrochloric acid, ammonium hydroxide, citric acid, oxalic acid, acetic acid, or calcium hypochlorite.

5. The method defined in claim 2 wherein the step separating the mercury from the vapors comprises contacting the vapors with an acid solution to precipitate the mercury, and separating the precipitated mercury from the acid solution by filtration.

6. The process defined in claim 5 wherein said solvent is an ammonium hydroxide solution, and wherein said acid solution is a solution containing sulfuric acid.

7. The process defined in claim 2 wherein, in addition to Hg, said coal contains trace amounts of at least one element selected from the group including Cr, Se, and As, and wherein the process further comprises the step of adding at least one precipitating agent to the solvent after separation from the coal, said precipitating agent being capable of forming a stable compound with Cr, Se, and/or As.

8. The process defined in claim 7 further comprising the step of separating the stable compound or compounds of Cr, Se and/or As from the separated solvent by filtration.

9. The process defined in claim 1 wherein the step of heating the slurry includes heating the slurry to a temperature substantially equal to the boiling temperature of the liquid solvent in the slurry.

10. The process defined in claim 9 further comprising the step of applying a reduced pressure to the closed container to thereby reduce the boiling temperature of the liquid solvent in the slurry.

11. The process defined in claim 1 wherein the step of separating the coal from the solvent comprises initially removing the liquid solvent and subsequently stripping residual solvent from the coal by passing steam through the coal mass.

12. The process defined in claim 11 wherein at least a portion of the liquid solvent separated from the coal is recycled to the closed container for reuse.

13. The process defined in claim 12 wherein, in addition to Hg, said coal contains trace amounts of at least one element selected from the group including Cr, Se, and As, and wherein the process further comprises the step of adding at least one precipitating agent to the solvent after said solvent is separated from the coal, said at least one precipitating agent being capable of forming a stable compound with Cr, Se, and/or As.

14. The process defined in claim 11 wherein the step of heating the slurry includes heating the slurry to a temperature substantially equal to the boiling temperature of the liquid solvent in the slurry.

15. The process defined in claim 14 further comprising the step of applying a reduced pressure to the closed container to thereby reduce the boiling temperature of the liquid solvent in the slurry.

16. The process defined in claim 14 further comprising the step of pressurizing the closed container containing the slurry to thereby increase the boiling point of the liquid solvent.

* * * * *